June 18, 1929.  A. A. KUCHER  1,717,390

AIRCRAFT

Filed July 2, 1927

WITNESSES:
E. Lutz

INVENTOR
A.A.Kucher
BY William A. Steiger
ATTORNEY

Patented June 18, 1929.

1,717,390

UNITED STATES PATENT OFFICE.

ANDREW A. KUCHER, OF CHESTER, PENNSYLVANIA.

AIRCRAFT.

Application filed July 2, 1927. Serial No. 203,016.

My invention relates to aircraft and particularly to the structural formation thereof and it has for an object to provide a structure of the character designated which shall possess extraordinary strength and rigidity consistent with its weight and which shall be formed or composed of a material of such a nature that the various portions can be fabricated with extraordinary ease and rapidity and the entire assembly readily and inexpensively effected.

Figure 1:
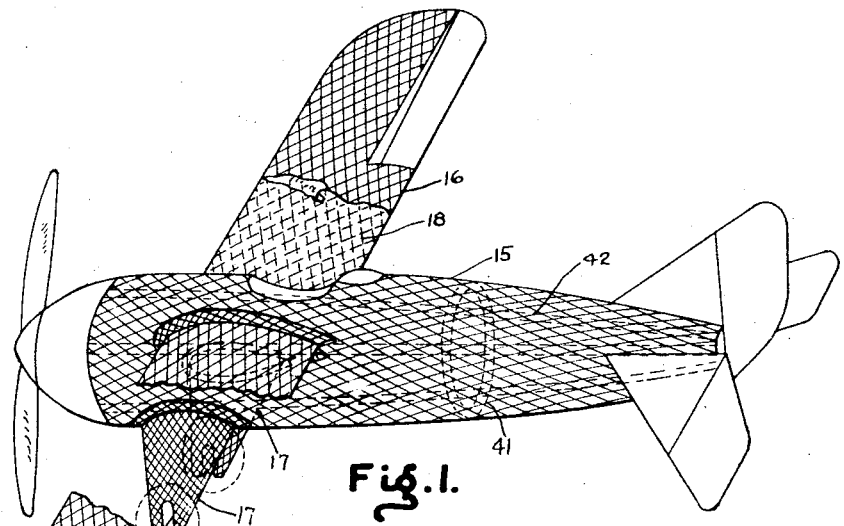
Figures 4, 5:
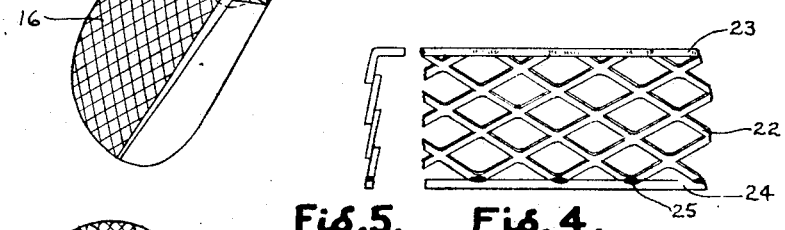
Figure 8:
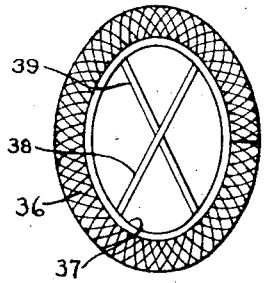
Figure 3:
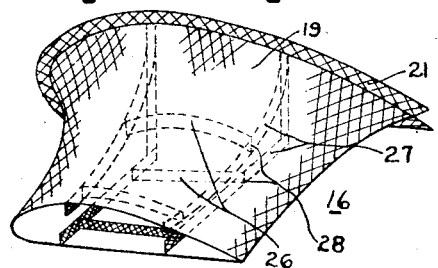
Figure 6:
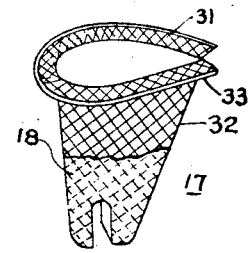
Figure 7:
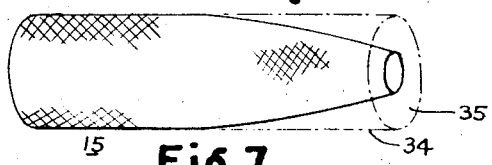
Figure 2:
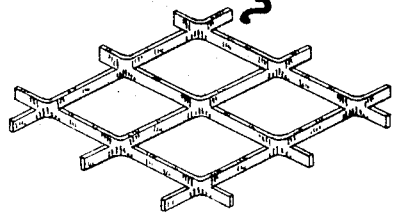

These and other objects, which will be made apparent through the further description of my invention, may be attained by the employment of the apparatus hereinafter described and illustrated in the accompanying drawing in which Fig. 1 is a view, in perspective, showing constructional details of one form of aeroplane formed in accordance with my invention; Fig. 2 is a plan view of one form of expanded metal utilized in the construction of the aeroplane shown in Fig. 1; Fig. 3 is a partial view, in perspective, of a wing portion of the aeroplane shown in Fig. 1; Fig. 4 is a partial view in elevation and Fig. 5 is an end view of one form of bracing member; Fig. 6 is a perspective view of a landing gear strut; Fig. 7 is a diagrammatic view showing the formation of the fuselage of the aeroplane and Fig. 8 is a detailed view of one of the bulkheads of the aeroplane.

It has heretofore been customary in the construction of aircraft to form the various portions, such as the fuselage, the wings, et cetera, of a very large number of frame members composed of either metal or wood and each so formed or shaped that when assembled together in spaced relation, the general form desired is produced. A covering material, such as fabric or light sheet metal is then secured to the exterior surface of the frame work in order to produce the completed part.

It will be obvious from the foregoing, that such a form of construction is rather expensive and ill adapted for manufacture upon a quantity production basis in that the material of which the entire frame structure is composed, either wood or conventional and well-known structural metal shapes such as Z bars, et cetera, is of such a natural character that it cannot be formed into the required shapes without the expenditure of considerable time and effort. Furthermore, with constructions of this character, the frame members must necessarily be spaced at substantial distances in order that the weight and manufacturing cost may not become excessive. As a result, the outside covering, which is either fabric or light sheet metal, is compelled to withstand the entire force or load created by the air pressure acting upon the spaces intervening between adjacent frame members. Consequently, a very high stress is set up in the covering material, a condition which causes deformation, impairs safety and reliability of operation and increases maintenance costs.

I have therefore conceived the idea of forming various portions of the aircraft, such as the fuselage, wings, et cetera, of a material such as or similar to that shown in Fig. 2, which material is generally referred to as "expanded metal". This metal differs from ordinary conventional wire screening material in that it may be formed from a solid plate, the manufacturing process being such that the metal is so worked and the strands so formed as to provide a sheet material which, although extremely light in weight, is extraordinarily rigid both longitudinally and transversely as well as laterally. In other words, it is capable of sustaining considerable load without serious deflection, while its weight may be only one-fourth that of a solid plate of the same gauge material or its area about four times that of the solid plate from which it is formed. Aside from this, however, the major advantage resides in the fact that it can be formed into almost any desired shape or conformation with extreme ease and with a minimum expenditure of labor. A suitable covering material may then be applied to the exterior surface of the metal and, because of the relatively close spacing of the strands, the stresses set up in the covering material are obviously very low.

Referring now to Fig. 1, I show one form of aeroplane in which 15 represents the body portion, 16 the wing portions and 17 the landing gear struts, all formed of expanded metal of the character shown in Fig. 2. A suitable covering material such as, for example, linen, cotton, veneer, or sheet metal, represented partially at 18, is applied to the exterior surfaces of the body, wing and strut portions. This covering material may be secured in various ways such as, for example, by sewing it to the expanded metal. The covering material may then be coated in the usual manner.

As shown in Fig. 3, the inner portion 19 of each of the wings 16, which portion forms the joint with the fuselage, may be flared or bell-mouthed in order to provide a longer and more rigid form of joint than that ordinarily provided, the nature of the structure being such that this can be readily accomplished without involving excessive labor costs. In this figure, 21 represents the connecting flange which may be welded or riveted to the fuselage. Although I may employ an expanded metal composed of some aluminum alloy in order to reduce the weight to a minimum, nevertheless the structure is inherently so light consistent with its strength that some heavier material which lends itself better to welding, such as steel, may be employed. For example, I have found that a wing structure constructed of steel in the manner illustrated complete with the outer covering and internal bracing weighs approximately one pound per square foot of wing surface, which figure compares favorably with the weight of conventional wing structures.

In Figs. 4 and 5 I show one form of detail structure which may be utilized in any portion of the aircraft, as for example, the wings for bracing or staying the same. This bracing member may also be formed from expanded metal and comprises a web portion 22, a heel portion 23 and a binder strip 24 which is preferably spot welded at a plurality of points, such as 25, to the web portion 22, in order to stiffen the entire angle section. In the wing portion shown in Fig. 3, the ribs 26 as well as the beams 27 are formed in this manner. In securing the wing and bracing members together, I prefer to first form the bracing member without the binder strip 24, forming it so as to comply with the contour of the wing and thence afterwards spot welding the binder strip 24 to the web portion. This is a very important feature of my process of construction because, in this way, the curvature of the bracing member is permanently retained. The ends of the ribs 26, shown at 28, are butted against the sides of the beams 27 and welded thereto, the entire wing structure including all stay members being formed into a single, unitary, autogenous structure.

In Fig. 6 I show a detail of the landing gear struts 17. In constructing this strut, I prefer to form the flange portion 31 before shaping the body portion 32, a binder strip 33, similar to the binder strip 24 of Fig. 4, being afterwards secured to the flange by some approved process such as riveting or welding. The entire strut may then be secured to the fuselage by a similar process.

In Fig. 7 a detail of the fuselage or body portion 15 is illustrated. In constructing this portion of the aircraft, I prefer to first form a cylinder of expanded metal, such as 34, and then circumferentially compress the end 35 so as to produce the required stream-line effect. This is made readily possible because of the employment of expanded metal which is readily susceptible to being compressed in this manner, the interstices or diamonds formed by the strands merely assuming a greater length longitudinally and a lesser width circumferentially. The body portion may be suitably stiffened by means of suitable braces and bulkheads.

One form of bulkhead which I prefer to employ is that shown in Fig. 8 wherein a single longitudinal strip of expanded metal is formed into an annulus or ellipse 36 and the meeting ends welded or riveted. A binder strip 37 may then be secured to the inner periphery for stiffening the same while suitable braces 38 and 39 may also be added. As shown in Fig. 1, a bulkhead may be inserted into the stream line body portion 15 as at 41, the out periphery of the bulkhead being welded to the annulus of expanded metal which forms the body portion 15. One very important feature of my form of construction consists in that the frames, braces, bulkheads, et cetera, may be secured to the expanded metal shell from the exterior as the welded joints may be formed through the openings in the metal. As shown in Fig. 1, suitable longitudinal stiffeners 42 may be provided in the body portion, these stiffeners being formed preferably in the manner illustrated in Figs. 4 and 5.

From the foregoing it will be apparent that I have evolved a very novel and practical form of construction for aircraft whereby various portions of the aircraft, even though if irregular or unusual in shape, may be rapidly fabricated with very little expenditure of time or labor. By means of such construction, air crafts of rather unusual form having extraordinary high aerodynamic efficiencies but which heretofore have been found commercially impractical because of the manufacturing difficulties involved, can now be readily constructed at lesser cost than the conventional shapes. Not only is my form of construction advantageous from a manufacturing standpoint but also from a safety standpoint in that, when completed, the entire aircraft comprises a unitary structure, formed into a single, autogenous metal structure. It is obvious that an aircraft so constructed might, under extraordinary circumstances, be bent or deformed but complete rupture or failure of the parts is not conceivable.

While I have shown one form of expanded metal for use in my invention, nevertheless, it is to be understood, that other forms of sheet metal having similar characteristics as to strength, weight, pliability, workability, et cetera, may be evolved which would also come within the purview of my invention. While I have applied my invention to aircraft of the heavier-than-air type, nevertheless it is equally applicable to aircraft of the lighter-than-air type.

While I have shown my invention in but one form, it will be obvious to those skilled in the art, that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. An aircraft surface comprising, in combination, a layer of expanded metal and a covering material secured thereto.

2. An aircraft structure composed of a shell portion formed of expanded metal, and a covering material secured thereto.

3. An aircraft structure composed of a shell portion formed of expanded metal, a covering material secured thereto, and internal members bracing the shell portion.

4. An aircraft structure composed of a shell portion formed of expanded metal, an outer covering material secured thereto, and internal members bracing the shell portion, said internal members being composed, at least in part, of expanded metal.

5. An aerofoil composed of a shell portion formed, at least in part, of expanded metal, and a covering material secured thereto.

6. A fuselage composed of a shell portion formed, at least in part, of expanded metal, and a covering material secured thereto.

7. A fuselage composed of a shell portion formed, at least in part, of expanded metal, an outer covering material secured thereto, and bracing members located interiorly of the shell portion, said bracing members being formed, at least in part, of expanded metal.

8. A bracing member for aircraft structures composed of expanded metal and a binder strip secured thereto.

9. An internal bracing member for aircraft structures composed of expanded metal formed into substantially an L cross-section, and a binder strip secured to one of the longitudinal edges of the expanded metal.

10. A landing gear strut for aircraft embodying a shell portion formed, at least in part, of expanded metal and a covering material secured thereto.

11. An aircraft embodying wing and body portions, both of said wing and body portions comprising a shell formed, at least in part, of expanded metal, the expanded metal of the wing portion being so secured to the expanded metal of the body portion as to form a unitary, autogenous structure, and a covering material secured to the expanded metal of both said wing and body portions.

12. An aircraft embodying wing and body portions, both of said wing and body portions having a shell formed, at least in part, of expanded metal, said wing portion being flared in the vicinity of the body portion, means for securing the flared ends of the wing portions to the body portion, whereby they are securely joined, and an outer covering material secured to the expanded metal of both said wing and body portions.

13. The method of constructing an aircraft structure which consists in forming a sheet of expanded metal into a predetermined conformation, welding the two ends of the sheet together, and securing covering material to the outer surface thereof.

14. The method of constructing an aircraft structure which consists in forming expanded sheet metal into shape to form the body and wing portions, welding the wing portion to the body portion, and securing a covering material to the outer surfaces of both the body and wing portions.

15. The method of constructing a stiffening member for aircraft structures and the like having irregular contours, which consist in forming a strip of expanded metal into such shape as to substantially conform longitudinally with the require contour, welding a binder to one longitudinal edge of the strip, and securing the structure to the other longitudinal edge of the strip.

In testimony whereof, I have hereunto subscribed my name this 23rd day of June, 1927.

ANDREW A. KUCHER.